US005745709A

United States Patent [19]
Okabayashi et al.

[11] Patent Number: 5,745,709
[45] Date of Patent: Apr. 28, 1998

[54] DATA TRANSFER APPARATUS AND SYSTEM PROVIDING HIGH SPEED SWITCHING TO ALLOW FOR HIGH SPEED DATA TRANSFER BETWEEN ONE DEVICE AND MULTIPLE DEVICES

[75] Inventors: Ichiro Okabayashi, Takatsuki; Katsuyuki Kaneko, Moriguchi; Hiroshi Kadota, Toyonaka, all of Japan

[73] Assignee: Matsushita Electric Industrial C., Ltd., Osaka-fu, Japan

[21] Appl. No.: 497,864

[22] Filed: Jul. 3, 1995

[30] Foreign Application Priority Data

Jul. 5, 1994 [JP] Japan .................................. 6-153969

[51] Int. Cl.$^6$ ...................................................... G06F 13/00
[52] U.S. Cl. ............................................ 395/311; 858/481
[58] Field of Search ................................... 395/311, 312, 395/858

[56] References Cited

U.S. PATENT DOCUMENTS

| | | | |
|---|---|---|---|
| Re. 31,153 | 2/1983 | Caddell | 365/236 |
| 4,044,333 | 8/1977 | Auspurg et al. | 395/311 |
| 4,575,814 | 3/1986 | Brooks, Jr. et al. | 395/421.07 |
| 4,816,993 | 3/1989 | Takahashi et al. | 395/250 |
| 5,185,876 | 2/1993 | Nguyen et al. | 395/841 |
| 5,253,346 | 10/1993 | Okabayashi et al. | 395/309 |
| 5,269,010 | 12/1993 | MacDonald | 395/405 |
| 5,274,788 | 12/1993 | Koike | 395/484 |
| 5,325,502 | 6/1994 | McLaury | 395/496 |
| 5,513,364 | 4/1996 | Nishikawa | 395/287 |
| 5,550,986 | 8/1996 | DuLac | 395/280 |

FOREIGN PATENT DOCUMENTS 4169955  6/1992  Japan .

*Primary Examiner*—Jack B. Harvey
*Assistant Examiner*—Sumati Lefkowitz
*Attorney, Agent, or Firm*—Price, Gess & Ubell

[57] ABSTRACT

A data transfer apparatus for providing efficient data transfer between one memory device and multiple devices by providing high speed switching of the multiple devices according to a count of the number of the data transfers performed between the one memory device and any of the multiple devices. The data transfer apparatus comprises a transferring unit for controlling a data transfer between the memory and a device; a counting unit for counting one each time data is transferred; and a selecting unit for selecting a device in accordance with a count value by decoding the count value output from the counting unit. The transferring unit controls the data transfer between the memory and the device selected by the selecting unit. The above data transfer apparatus may include the counting unit consisting of n-bits of a binary counter, $2^n$ devices, and the selecting unit consisting of a decoder that inputs n-bits and outputs $2^n$-bits of data.

13 Claims, 10 Drawing Sheets

Fig. 2
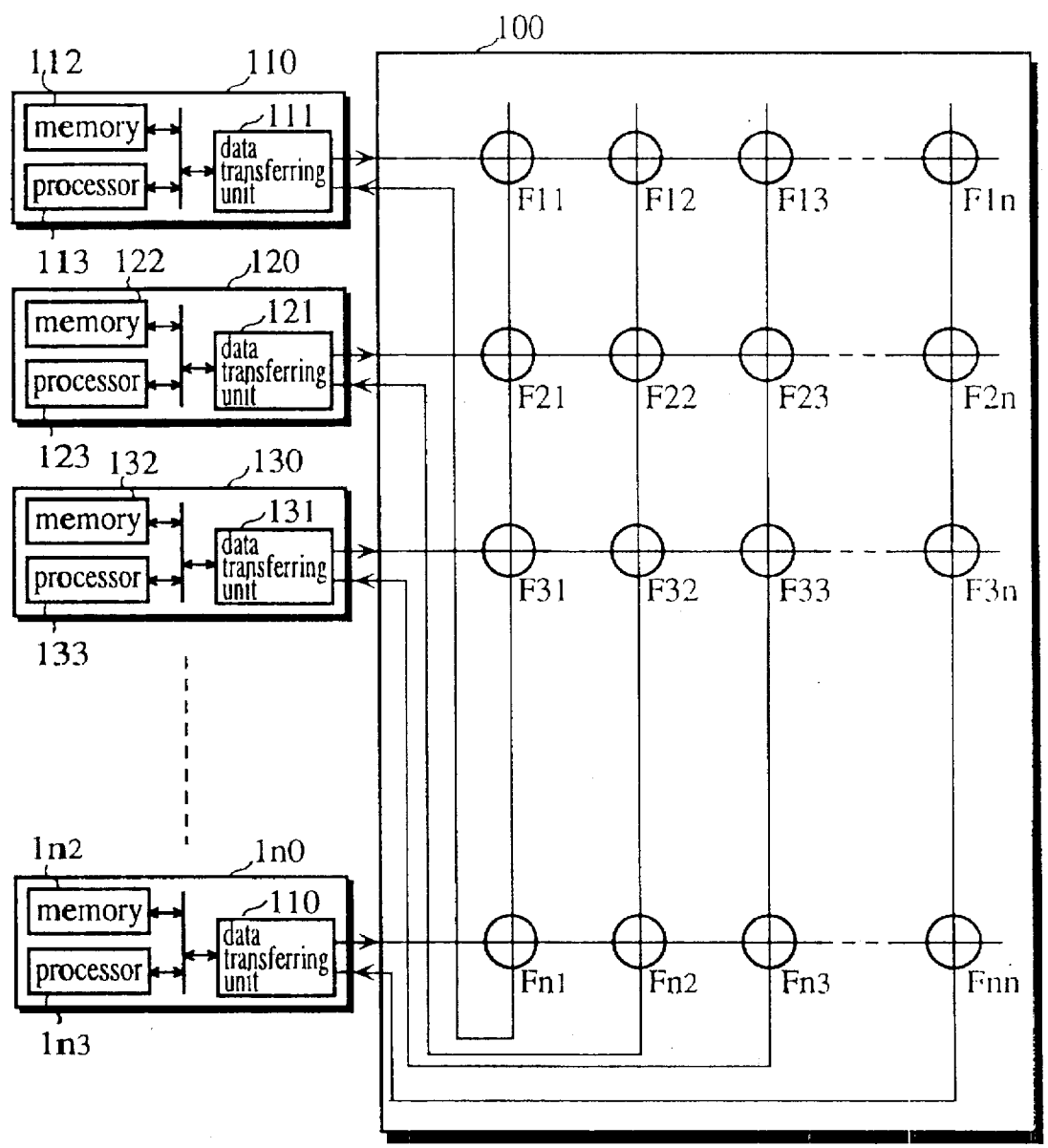
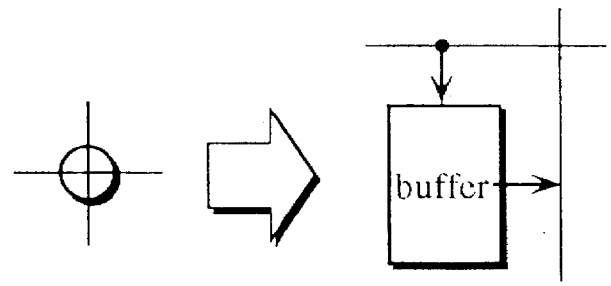

DATA TRANSFER APPARATUS AND SYSTEM PROVIDING HIGH SPEED SWITCHING TO ALLOW FOR HIGH SPEED DATA TRANSFER BETWEEN ONE DEVICE AND MULTIPLE DEVICES

BACKGROUND OF THE INVENTION

(1) Field of the Invention

This invention relates to a data transfer apparatus and system for transferring data between devices in a computer system.

(2) Description of the Prior Art

Along with recent improvements in computer systems, especially in parallel processing systems, apparatuses used in such systems have become more complicated and the number of data transfers among multiple devices has increased drastically. Currently, a number of studies on how to speed up the data transfer in such systems are going on.

In the field of micro computers, serial interfaces have been used for transferring data between micro computers and other micro computers or devices. FIG. 1 is a block diagram showing the structure of the main part of a serial interface of the micro computer system disclosed in Japanese Laid-Open Patent Application No. 04-169955.

In the figure, data is transmitted as serial data from the memory 53 to an outer device via the shift register 54, and data is also transferred reversely via the shift register 54. Data is transmitted and received alternately as follows:

The number of transfers is moved from the transfer number specification register 51 to the transfer number counter 50, which is the start of a data transmission or reception. The transfer number counter 50 counts the number of transfers, and reverses the transfer direction specification flag 52 at the completion of the counting. When the flag 52 is reversed, the memory register switch signal 55 changes. The change lets the transfer direction between the memory 53 and the shift register 54 be reversed. In this way, high-speed switching of the transfer direction is realized.

However, the above serial interface (data transfer apparatus) of a prior art has a problem: the apparatus is convenient for data transfer between two devices, namely one to one, but not for data transfer between one device and multiple devices. This is because the art cannot switch the devices at high speed.

General purpose Direct Memory Access Controller (DMAC) has the same problem. It may have a plurality of channels, and it can transfer data between one device and multiple devices by changing the channels. However, since they are made on the condition that data is transferred from one device to another, or one to one, it takes a lot of time to switch the channels.

SUMMARY OF THE INVENTION

An object of the present invention, in consideration of the above mentioned problems, is to provide data transfer apparatuses and systems which efficiently transfer data between one device and multiple devices.

Especially, it is another object of the present invention to provide data transfer apparatuses and systems that are most suitable for a parallel computing system in which communications between one device and multiple devices play a vital role.

The above objects are fulfilled by a data transfer apparatus for transferring data between a memory and a plurality of devices, including: a counting unit for counting each time a sequence of data is transferred between the memory and any the device; a selecting unit for selecting one of the plurality of devices according to a count value output from the counting unit; and a transferring unit for transferring data between the memory and the device selected by the selecting unit.

The above structure enables the apparatus to switch the destination of data transfer at high speed.

In the above data transfer apparatus, the counting unit may include an n-bit binary counter, n being an integer greater than 0, there may be $2^n$ of the plurality of devices, and the selecting unit may consist of an n-bit-input/$2^n$-bit-output decoder, each of the $2^n$-bit outputs being exclusively for one of the $2^n$ devices.

The above structure enables us to choose the number of devices that is suitable for computer processing such as 2, 4, 8 ..., etc.

The counting unit of the above data transfer apparatus may further include: a register for storing a number showing how many times data is to be transferred successively from or to any of the devices; a first counter for counting each time the transferring unit transfers data, and for outputting a clock pulse each time the first counter counts the number stored in the register; and a second counter for counting each time the clock pulse is output, and for outputting the count value to the selecting unit.

The above structure enables the apparatus to switch at high speed the destination of data transfer every time a successive data transfer over the number of times stored in the register completes.

The counting unit of the above data transfer apparatus may further include a limit register for storing a threshold value for the second counter, the second counter returning to an initial value if the count value reaches to the threshold value.

The above data transfer apparatus may further include: a temporary storing unit put between the memory and the device for temporarily storing data, the transferring unit transferring data via the temporary storing unit.

The above structure provides an efficient data transfer in addition to a high-speed switching of devices because it arranges the difference of the access speed between the memory and device.

In the above data transfer apparatus, the selecting unit may decode the count value to assert one of a plurality of selection signals, each of which is exclusively for one of the plurality of devices.

The above structure enables the apparatus to switch devices instantly. It only takes the circuit delay time for the hardware to decode the counted value and output the selected signal.

The above objects are also fulfilled by a data transfer system for transferring data in a parallel computing system with $2^n$ processor elements via a network which interconnects the $2^n$ processor elements, n being an integer greater than 0, comprising: a network comprising a plurality of two-port memories arrayed in $2^n$ rows×$2^n$ columns of matrix, $2^n$ row buses, each of which connecting to one of two ports of each of the plurality of two-port memories in a row corresponding to the row bus, and $2^n$ column buses, each of which connecting to the other of two ports of each of the plurality of two-port memories in a column corresponding to the column bus, so that a pair, different from each other, of the row bus and column bus connected to each processor element; and a plurality of data transfer apparatuses, each of which is provided to a corresponding processor element, for transferring data between a memory in the same processor element and two-port memories on the pair of row bus and column bus connected to the same processor element, each of the data transfer apparatus comprising: a first buffer unit for temporarily storing data; a first counting unit for counting each time a sequence of data is transferred from the memory to any two-port memory; a first selecting unit for decoding a count value output from the first counting unit to select a two-port memory, on the row bus, corresponding to the count value; a first transferring unit for transferring data from the memory to the two-port memory selected by the first selecting unit via the first buffer unit; a second buffer unit for temporarily storing data; a second counting unit for counting each time a sequence of data is transferred from any two-port memory to the memory; a second selecting unit for decoding a count value output from the second counting unit to select a two-port memory, on the column bus, corresponding to the count value; and a second transferring unit for transferring data from the two-port memory selected by the second selecting unit to the memory via the second buffer unit.

In the above data transfer system, the first counting unit consists of an n-bit binary counter, the first selecting unit consists of an n-bit-input/$2^n$-bit-output decoder, each of the $2^n$-bit outputs is output as a selection signal being exclusively for one of the two-port memories in the predetermined row, the second counting unit consists of an n-bit binary counter, the second selecting unit consists of an n-bit-input/$2^n$-bit-output decoder, each of the $2^n$-bit outputs is output as a selection signal being exclusively for one of the two-port memories in the predetermined column.

In the above data transfer apparatus, the data transfer apparatus may include: a first selection signal unit for selectively outputting the selection signals output from the first selecting unit and the second selecting unit to one of the two-port memories on the row bus; a second selection signal unit for selectively outputting the selection signals output from the first selecting unit and the second selecting unit to one of the two-port memories on the column bus; a first switching unit, connected to the first buffer unit, the second buffer unit, and the row bus, for selectively switching a data drive from the first buffer unit to the row bus and a data drive from the row bus to the second buffer unit; and a second switching unit, connected to the first buffer unit, the second buffer unit, and the column bus, for selectively switching the data drive from the column bus to the second buffer unit and the data drive from the first buffer unit to the column bus, the first transferring unit making the first selection signal unit and the first switching unit select the former option to transfer data to a two-port memory on the row bus, and making them select the latter option to transfer data to a two-port memory on the column bus, the second transferring unit making the second selection signal unit and the second switching unit select a former option to transfer data from a two-port memory on the row bus, and making them select the latter option to transfer data from a two-port memory on the column bus.

In the above data transfer system, each two-port memory may include: an FIFO memory which is a First-In-First-Out memory; a row-bus switching unit, connected to the row bus corresponding to the two-port memory containing this unit, for driving data from the row bus to a data input terminal of the FIFO memory when the first transferring unit selects the former option, and for driving data from a data output terminal of the FIFO memory to the row bus when the second transferring unit selects the latter option; and a column-bus switching unit, connected to the column bus corresponding to the two-port memory containing this unit, for driving data from a data output terminal of the FIFO memory to the column bus when the second transferring unit selects the former option, and for driving data from the column bus to a data input terminal of the FIFO memory when the first transferring unit selects the latter option.

The above structure enables the apparatus to select any direction for transferring data at two-port memories on the row bus and at two-port memories on the column bus.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 2 shows a block diagram which outlines the structure of a parallel computing system to which the data transfer apparatuses in the embodiments of the present invention are adapted.

DESCRIPTION OF THE PREFERRED EMBODIMENTS

<First embodiment>

Figure 1:
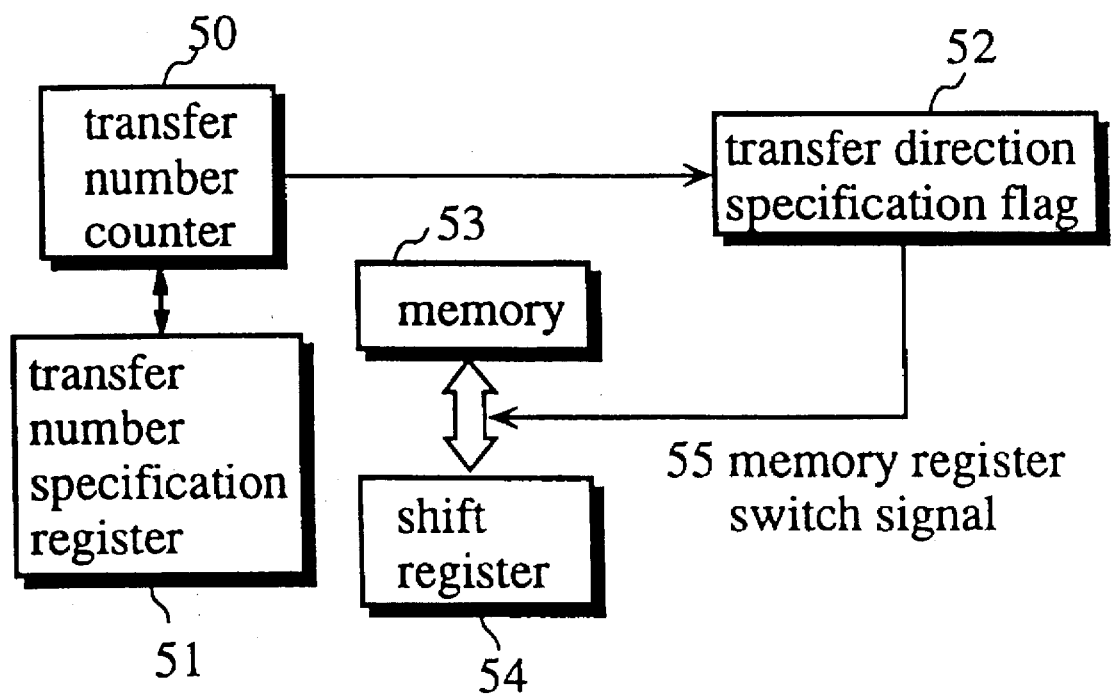
FIG. 1 is a block diagram illustrating the structure of a prior art serial interface in a micro computer.

The data transfer apparatus in the first embodiment of the present invention is explained below with the reference of the figures.

FIG. 2 shows a block diagram which outlines the structure of a parallel computing system to which the data transfer apparatuses in the embodiments of the present invention are adapted. The parallel computing system has a plurality of processor elements 110, 120, 130 . . . and 1n0 connected to network 100. Practically, the number of the processor elements (hereinafter PEs) can be any of several to several hundreds. Since every PE is the same as the other PEs, PE110 is explained as a sample.

PE110 includes data transferring unit 111, memory 112, and processor 113. PE110 shares calculations, such as array calculation, with other PEs. So, PEs transfer their operation results to each other via network 100 if necessary. Generally, the data transfer like this is performed frequently.

Network 100 deals with data transfers among the PEs. Network 100 consists of buffers F11 to Fnn, which are all First In First Out (FIFO) memories arrayed in matrix to interconnect the PEs.

Data transferring unit 111 transmits data of memory 112 to another PE via network 100, and receives data from another PE via network 100 and stores the data in memory 112. On data transmission, data transferring unit 111 transfers data from memory 112 to any of buffer F11 to F1n. On data reception, data transferring unit 111 transfers data from any of buffer F11 to Fn1 to memory 112. For example, when PE 110 is to transmit data to PE 120, data transferring unit 111 reads data from memory 112 and writes the data into buffer F12. In the reversed direction, when PE 110 is to receive data from PE 120, data transferring unit 111 reads data from buffer F21 and writes the data into memory 112.

Processor 113 performs calculations on the data in memory 112 according to the program in memory 112.

Figure 3:
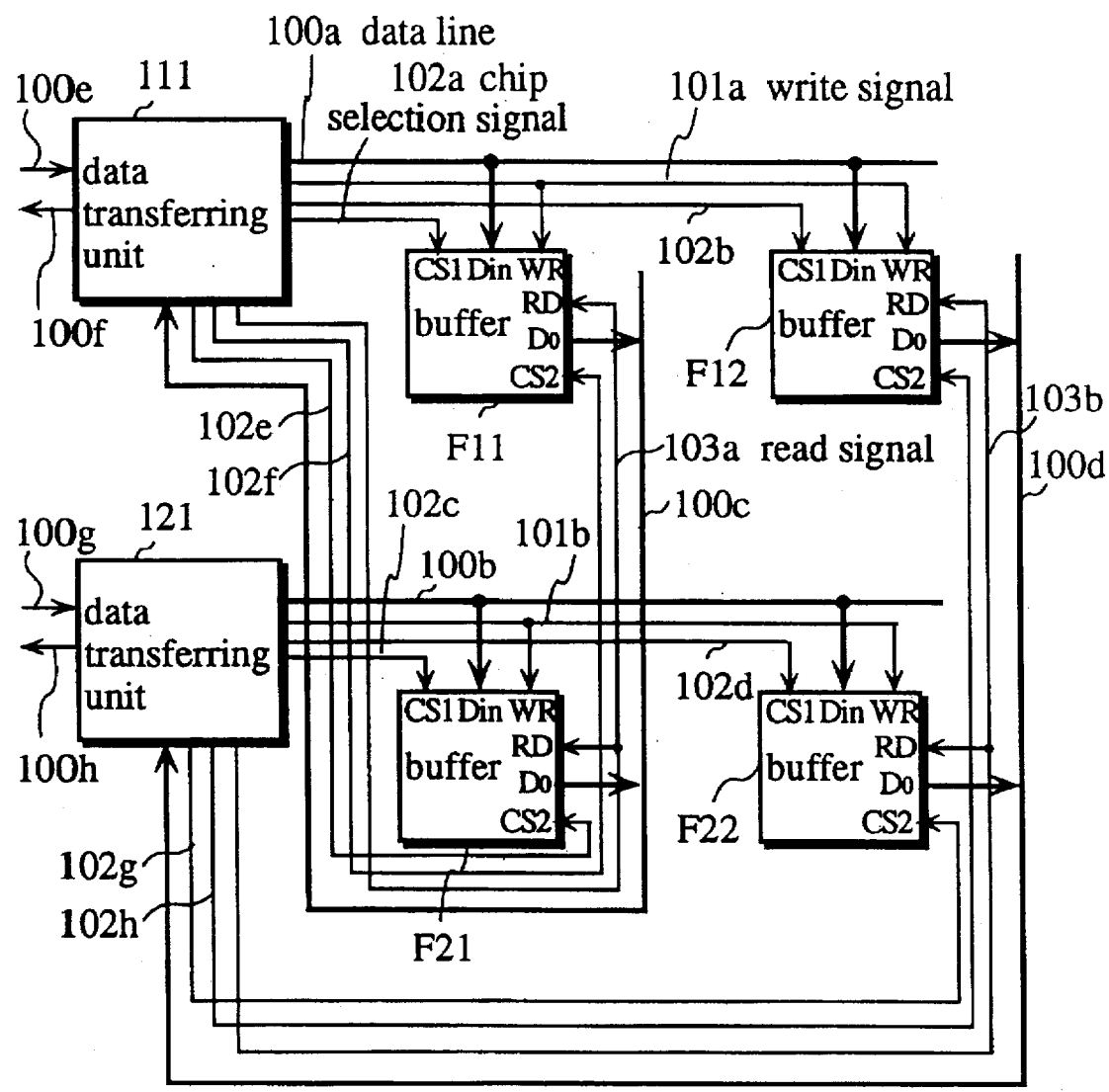
FIG. 3 shows a block diagram illustrating the structure of the data transfer apparatus and network in the first embodiment of the present invention.

FIG. 3 is a block diagram depicting the detailed structure of a parallel computing system comprising data transferring units 111 and 121, and network 100. This is a parallel computing system in FIG. 2, comprising two PEs.

Data transfer unit 111 outputs data on data line 100a, and asserts write signal 101a and chip selection signals 102a and 102b, when transferring data from memory 112 to network 100. In the reversed direction, data transferring unit 111 inputs data from data line 100c, and asserts read signal 103a and chip selection signals 102e and 102f, when transferring data from network 100 to memory 112.

Buffer F11 is focused on here. When chip selection signal 102a selects buffer F11, write signal 101a is asserted. Then, buffer F11 inputs data on data line 100a. Also, when chip selection signal 102f selects buffer F11, read signal 103a is asserted. Then, buffer F11 outputs data onto line 100c. The above operational flow is the same in F12, F21, and F22.

Figure 4:
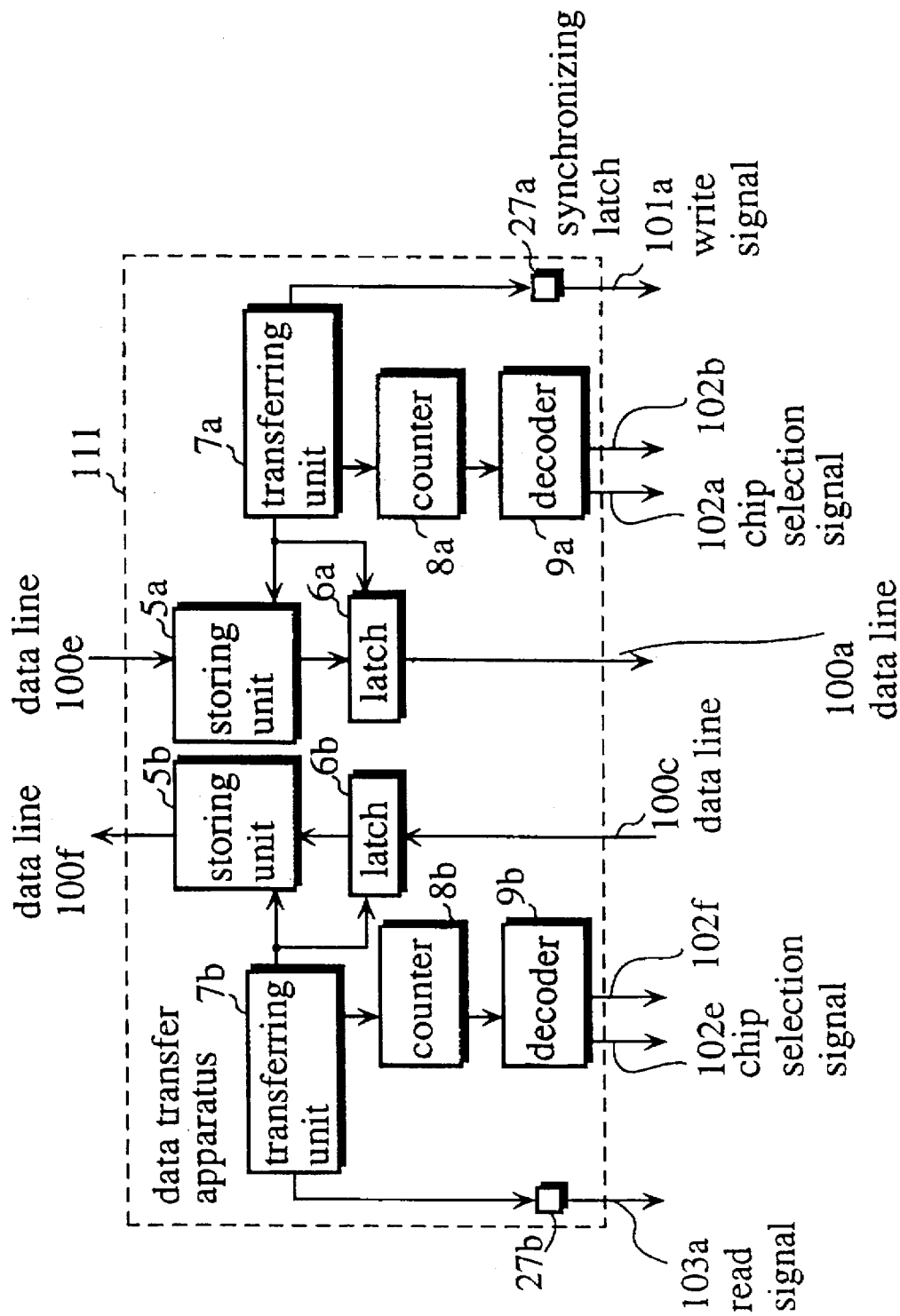
FIG. 4 shows a detailed structure of the data transferring unit in the first embodiment of the present invention.

FIG. 4 is a block diagram depicting the detailed structure of data transferring unit 111. As the figure shows, data transferring unit 111 includes storing unit 5a, latch 6a, transferring unit 7a, counter 8a, decoder 9a, and synchronizing latch 27a for data transfer to network 100, as well as storing unit 5b, latch 6b, transferring unit 7b, counter 8b, decoder 9b, and synchronizing latch 27b for data reception from network 100.

Storing unit 5a, consisting of a FIFO memory, receives data from memory 112 and temporarily stores the data with First In First Out.

Latch 6a latches the first data in storing unit 5a and outputs the data onto data line 100a according to the instruction of transferring unit 7a.

Transferring unit 7a first stores data from data line 100e in storing unit 5a when transmitting data, then transfers the data to latch 6a and asserts write signal 101a. At the same time, transferring unit 7a sends the instruction on counting to counter 8a.

Counter 8a counts up one each time it transmits data from latch 6a to a buffer in network 100. In this embodiment, there are two buffers to receive data, as shown in FIG. 3. So, counter 8a consists of one bit and outputs "0" and "1" alternately.

Decoder 9a decodes the count output of counter 8a, and asserts chip selection signal 102b for buffer F12 if the count is "1", and asserts chip selection signal 102a for buffer F11 if the count is "0".

Synchronizing latch 27a latches the write signal from transferring unit 7a, and outputs the write signal 101a for buffers F11 and F12.

Storing unit 5b, latch 6b, transferring unit 7b, counter 8b, decoder 9b, and synchronizing latch 27b are not explained here because they are similar to their counterparts, 5a to 9a and 27a. However, since the direction of their data transfer is different from their counterparts, transferring unit 7b takes control of them so that latch 6b and storing unit 5b temporarily store data from buffers F11 and F21 of network 100 and output the data to memory 112.

Figure 5:
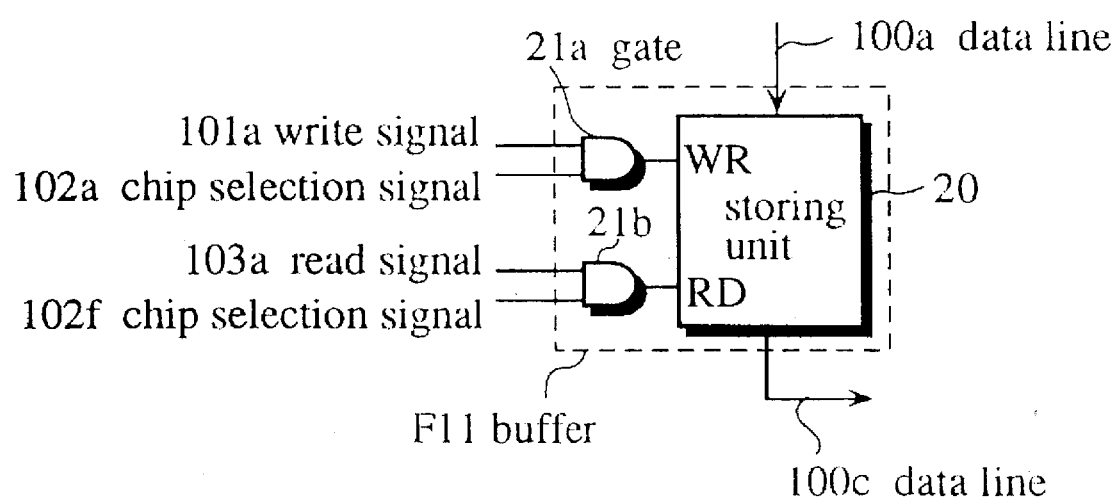
FIG. 5 shows a detailed structure of the buffer in the first embodiment of the present invention.

FIG. 5 is a block diagram depicting the detailed structure of buffer F11. As the figure shows, buffer F11 consists of storing unit 20 and gates 21a and 21b. Storing unit 20, consisting of a FIFO memory, inputs data from data line 100a when the write control terminal (WR), write signal 101a and chip selection signal 102a are asserted. Also, storing unit 20 outputs its first data to data line 100c when the read control terminal (RD), read signal 103a and chip selection signal 102f are asserted. The above structure is the same in F12, F21, and F22.

Figure 6:
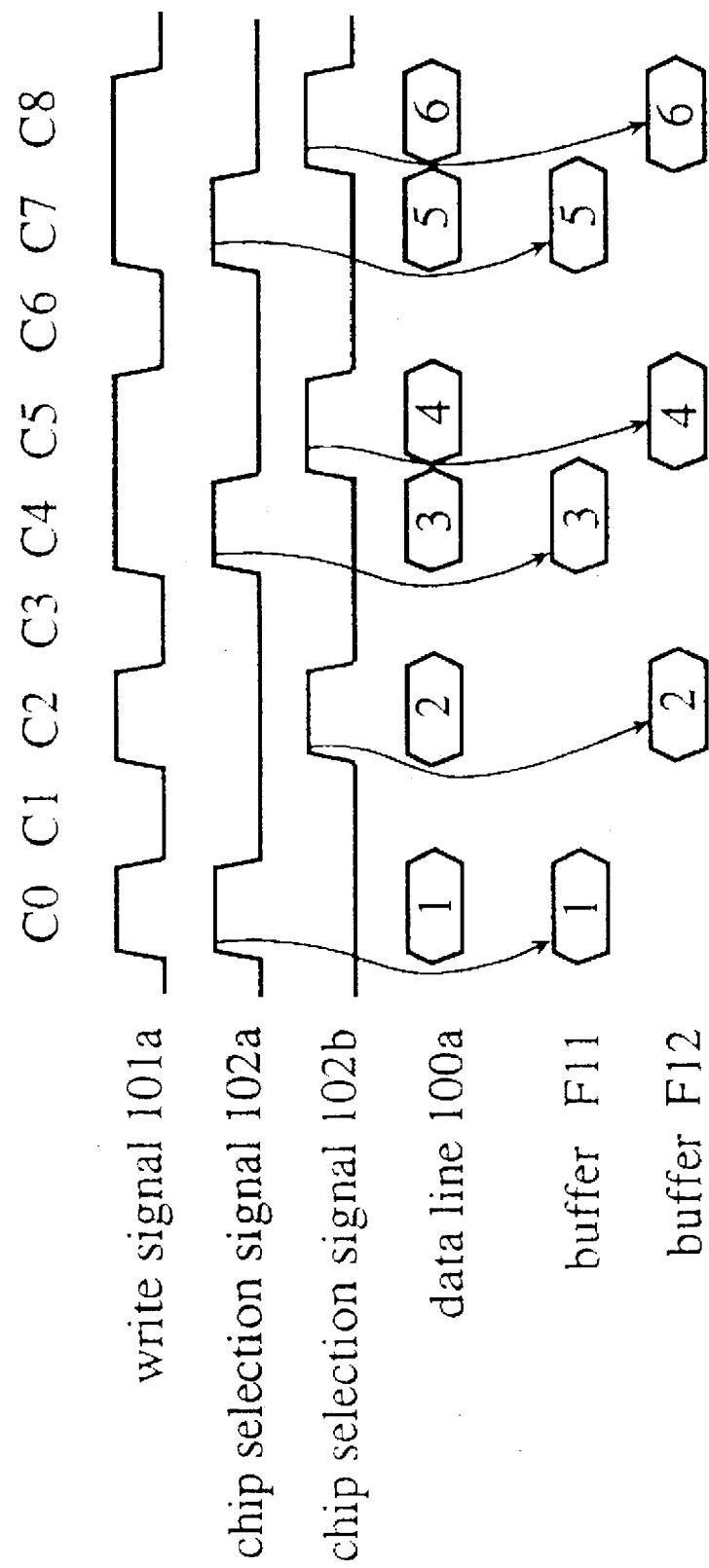
FIG. 6 shows an operation timing chart in the first embodiment of the present invention.

The data transfer apparatus in the first embodiment of the present invention has the above structure, and its operation is explained now with the reference of FIG. 6, a timing chart showing the timing of operation.

FIG. 6 explains how data transferring unit 111 transmits data to buffers F11 and F12 alternately. C0 to C8 in the figure represent the cycle numbers which indicate the basic timing of operation.

First, at cycle C0, data transferring unit 111 outputs write signal 101a and chip selection signal 102a and writes data from data line 100 into buffer F11. Then, at cycle C2, data transferring unit 111 outputs write signal 101a and chip selection signal 102b and writes data from data line 100 into buffer F12. At cycle C2, decoder 9a has asserted different chip selection signals because the value in counter 8a has been reversed from that at cycle C0. The following operations are similar to the above. In this way, chip selection signals 102a and 102b are asserted alternately, and data is sent to buffers F11 and F12 alternately.

As explained above, in the data transfer apparatus of the present embodiment, buffers to which data is transferred are switched with the progress of the counter. This contributes to realize a very high-speed switching of the transfer object in data transfer between one device and multiple devices.

Although the present embodiment explains the case where two buffers are connected to transmitting side and receiving side respectively as shown in FIG. 2, practically any number being available as the number of buffers. For example, if four buffers F11 to F14 are connected to the transmitting side, counters 8a and 8b will be made of two bits respectively, decoders 9a and 9b will respectively decode the two bits output, and chip selection signals will be four. The structure is the same in the receiving side.

<Second embodiment>

For the structures of the data transfer apparatus, network, and buffer of the second embodiment of the present invention, see FIG. 3, FIG. 5 and First Embodiment.

Figure 7:
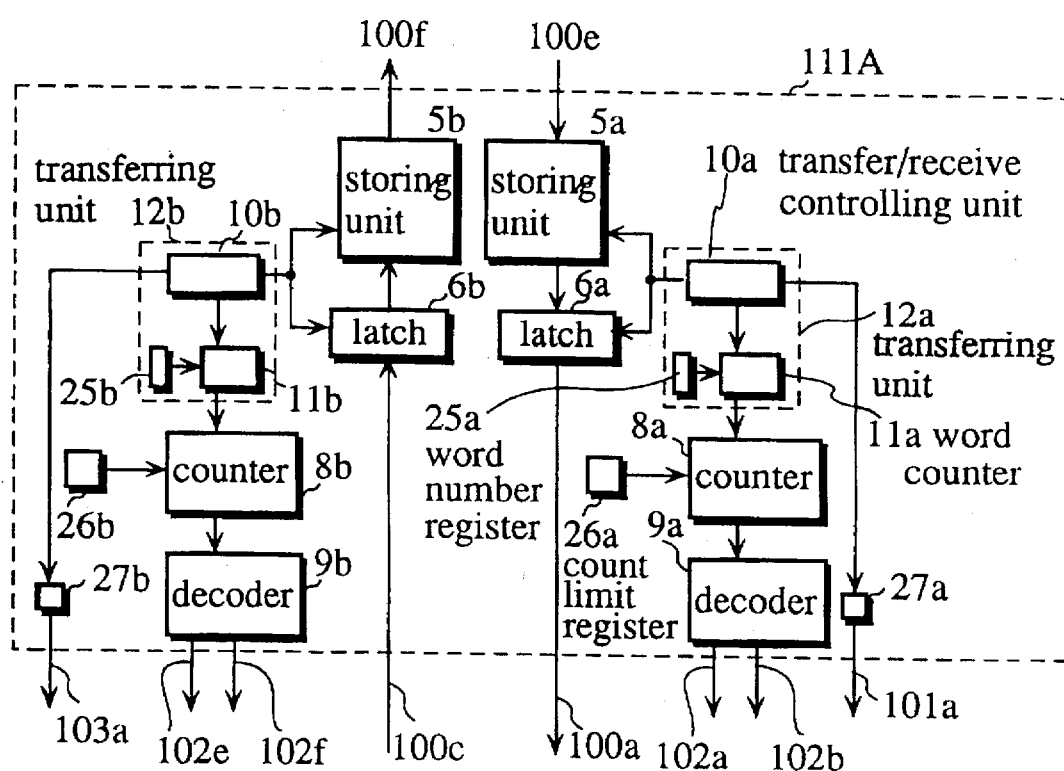
FIG. 7 shows a detailed structure of the data transfer apparatus in the second embodiment of the present invention.

FIG. 7 is a block diagram depicting the detailed structure of the data transfer apparatus of the second embodiment of the present invention. The data transferring unit differs from that in FIG. 4 in that it has transferring units 12a and 12b instead of 7a and 7b, and additionally has count limit registers 26a and 26b. Only the new components are explained below.

Transferring unit 12a includes transmit/receive controlling unit 10a, word counter 11a, and word number register 25a.

Word number register 25a stores a number that indicates the number of words that are written successively in a buffer at a time.

Word counter 11a outputs a clock to counter 8a each time word counter 11a counts the same number of times as the stored number of words in the word number register 25a. For example, if word number register 25a indicates "3", word counter 11a operates as "0, 1, 2, 0, 1, 2, . . . ", and outputs a clock to counter 8a on returning from 2 to 0. As a result, counter 8a counts every three data transfers.

In the present embodiment, "2" is set in word counter 11a. Count limit register 26a stores a value which indicates the upper bound value of counter 8a. For example, if count limit register 26 stores "4", counter 8a operates as "0, 1, 2, 3, 0, 1, 2, 3, . . . ". In FIG. 3, two buffers are connected to transmitting side and receiving side respectively, "2" is set in both count limit registers 26a and 26b.

Figure 8:
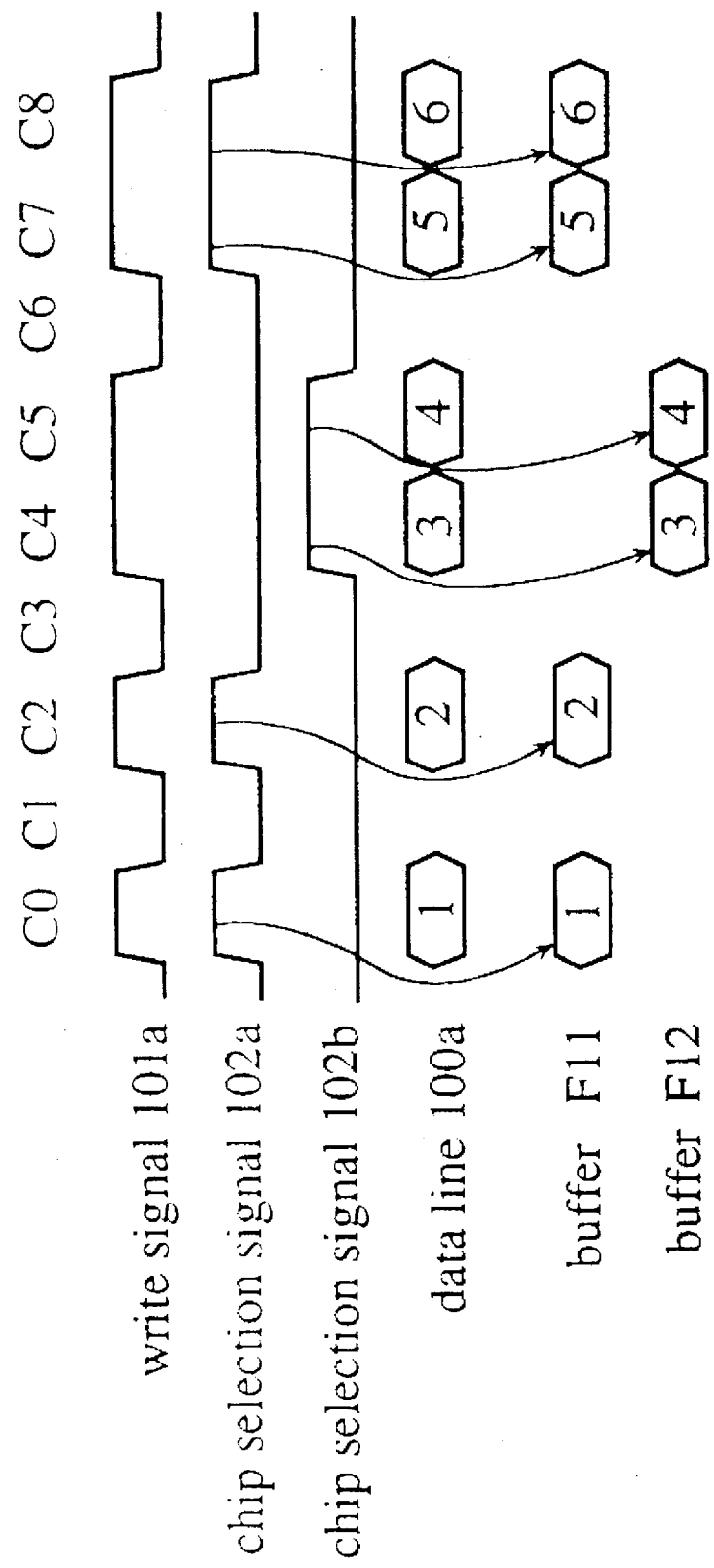
FIG. 8 shows an operation timing chart in the second embodiment of the present invention.

The data transfer apparatus in the second embodiment of the present invention has the above structure, and is explained now with the reference of FIG. 8, a timing chart showing the timing of operation.

It is assumed that "2" has been set in word counters 11a and 11b, and also "2" has been set in count limit registers 26a and 26b.

Word counter 11a takes "0" at cycle C0, and "1" at cycle C2. At this point, counter 8a has not counted yet. So, data transferring unit 111 outputs write signal 101a and chip selection signal 102a at both cycles C0 and C2, and writes data successively into buffer F11.

At the completion of data transfer at cycle C2, word counter 11a returns from "1" to "0", and outputs a clock to counter 8a. This makes counter 8a reverse the value. And decoder 9a asserts the other chip selection signal, 102b.

Data transferring unit 111 outputs write signal 101a and chip selection signal 102b at both cycles C4 and C5, and writes data successively into buffer F12. The succeeding operations are similar to the above, and two pieces of data are transmitted to buffers F11 and F12 respectively.

As explained above, in the data transfer apparatus of the present embodiment, buffers to which data is transferred can be switched at high speed at any desired number of words.

<Third Embodiment>

The third embodiment of the present invention has nearly the same structures of the data transfer apparatus and network as the first embodiment as shown in FIGS. 2 and 3, except that data transfers among buffers F11 to Fnn and inputs/outputs between data transferring units 111 to 1n1 and network 100 in FIG. 2 are bi-directional.

Figure 9:
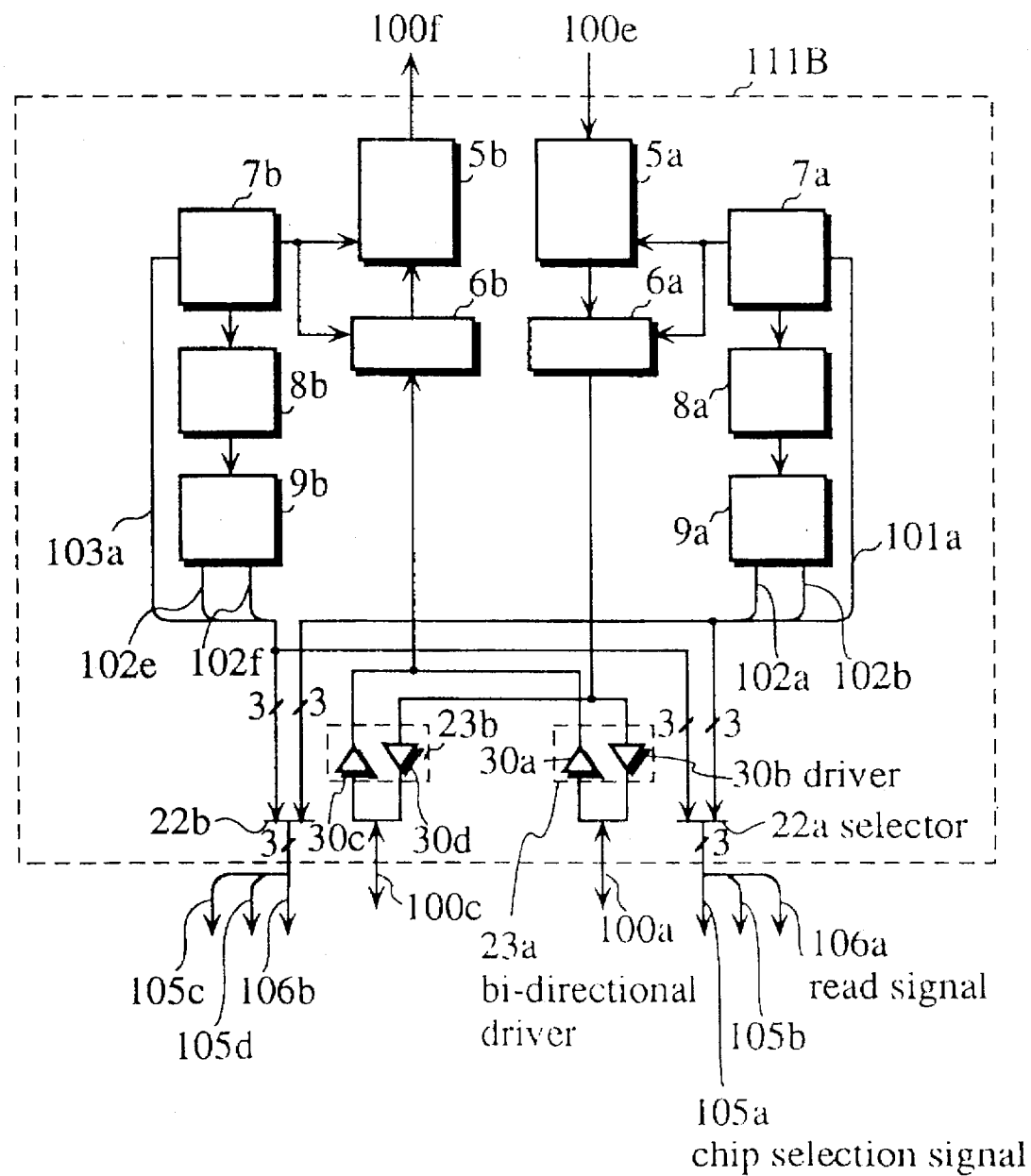
FIG. 9 shows a detailed structure of the data transfer apparatus in the third embodiment of the present invention.

FIG. 9 is a block diagram showing the detailed structure of the data transfer apparatus in the third embodiment of the present invention. The data transfer apparatus in FIG. 9 differs from the data transferring unit in FIG. 4 in that it additionally has selectors 22a and 22b and bi-directional drivers 23a and 23b.

Selector 22a receives a set of three signals: write signal 101a, and chip selection signals 102a and 102b (hereinafter right-hand signals) and another set of three signals: read signal 103a, and chip selection signals 102e and 102f (hereinafter left-hand signals), and outputs either set of signals. When storing unit 5a is to transfer data to buffers F11 and F12 in network 100, selector 22a selects the right-hand signals. When storing unit 5b is to receive data from buffers F11 and F12 in network 100, selector 22a selects the left-hand signals. The selected three signals are output as chip selection signals 105a and 105b and read/write signal 106a.

Bi-directional driver 23a consists of tristate drivers 30a and 30b. Either driver is enabled to drive data into either direction. Specifically, when the right-hand signals are selected, driver 30b is enabled; when the left-hand signals are selected, driver 30a is enabled.

Enabled driver 30b outputs data from latch 6a into buffers F11 and F12 in network 100. Disabled driver 30b holds high impedance and is electrically disconnected from network 100. On the other hand, enabled driver 30a outputs data from buffer F11 or F12 in network 100 into latch 6b. Disabled driver 30a holds high impedance and is electrically disconnected from latch 6b.

Selector 22b and bi-directional driver 23b have the same structures as the above counterparts, so their explanations are omitted here.

Figure 10:
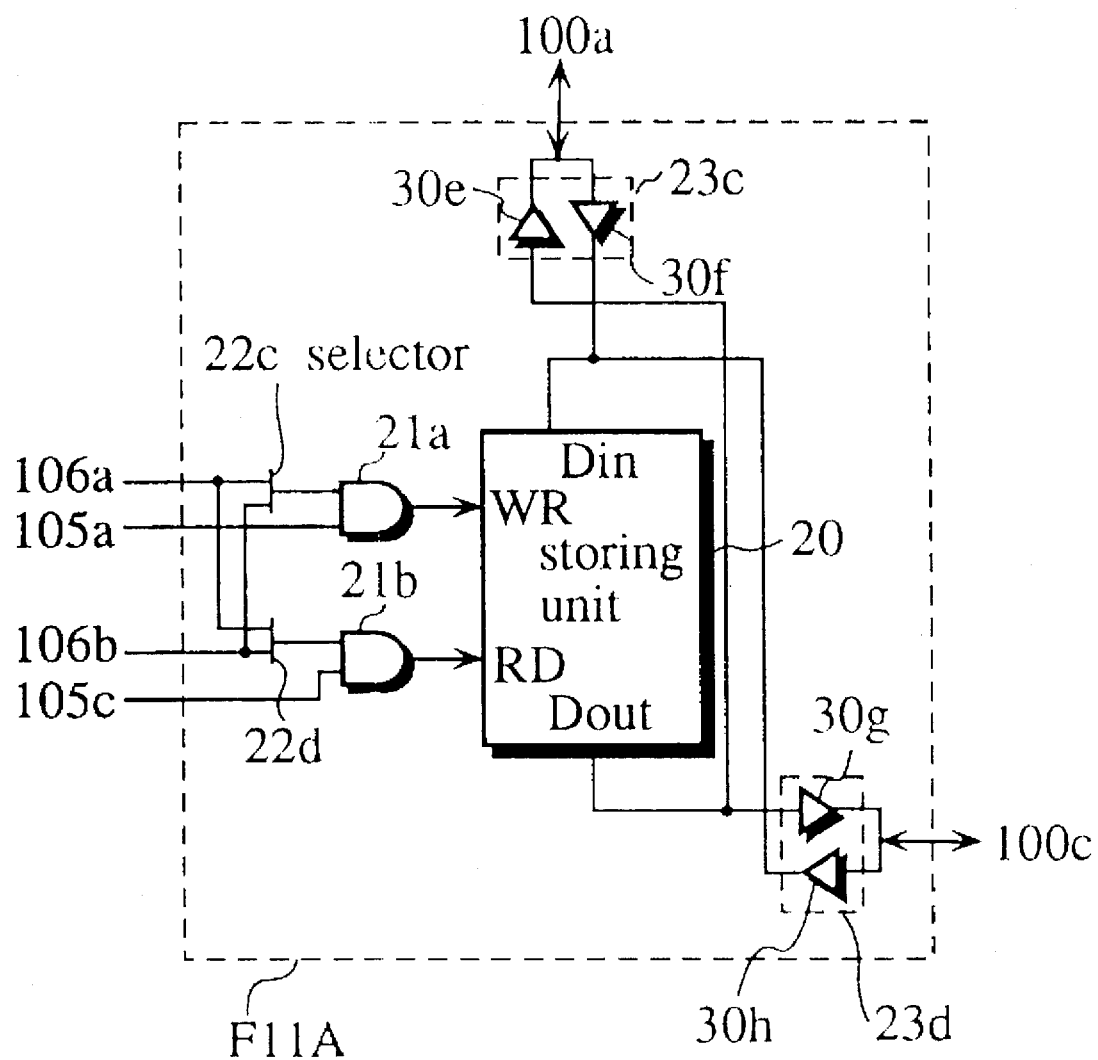
FIG. 10 shows a detailed structure of the buffer in the third embodiment of the present invention.

FIG. 10 is a block diagram depicting the detailed structure of a buffer in the third embodiment of the present invention. The buffer differs from that in FIG. 5 in that it additionally has selectors 22c and 22d and bi-directional drivers 23c and 23d.

Selector 22c receives read/write signals 106a and 106b and selects a write signal. Selector 22d receives read/write signals 106a and 106b and selects a read signal.

Bi-directional drivers 23c and 23d have the same compositions as the above mentioned bi-directional driver 23a, and drive data bi-directionally from/to data input terminal Din and data output terminal Dout of storing unit 20 to/from data lines 100a and 100c in network 100. Enabled driver 30e outputs data from storing unit 20 to data line 100a, and enabled driver 30h inputs data from data line 100c into storing unit 20. On the other hand, enabled driver 30g outputs data from storing unit 20 to data line 100c, and enabled driver 30f inputs the data from data line 100a into storing unit 20.

The data-flow direction in bi-directional drivers 23c and 23d and the signal selections done by selectors 22c and 22d may be controlled by transferring units 7a and 7b in the corresponding data transferring unit in consistence with its direction, or may be fixed in advance.

The data transfer apparatus in the third embodiment of the present invention has the above structure, and its operation is explained below.

There are two directions for data transferring unit 111: to transfer data to buffers F11 and F12 and receive data from buffers F11 and F21 (the same as the first embodiment); or to receive data from buffers F11 and F12 and transfer data to buffers F11 and F21. The direction is controlled by transferring units 7a and 7b in the data transferring unit. Each data is transferred the same as the first embodiment, and the explanation is omitted here.

As explained above, in the data transfer apparatus of the present embodiment, buffers to which data is transferred can be switched a t high speed, and any direction can be specified for data transfer. Due to the above improvements, buffers from or to which data is read or written can be increased.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A data transfer apparatus for transferring data between a memory and a plurality of devices, comprising:

a counting means for counting each time a sequence of data is transferred between the memory and any of said plurality of said devices;

a selecting means for selecting one of said plurality of devices according to a count value output from said counting means; and a transferring means for transferring data between said memory and said device selected by said selecting means, wherein said counting means includes a register for storing a number showing how many times data is to be transferred successively from or to any of said plurality of devices, a first counter for counting each time said transferring means transfers data, and for outputting a clock pulse each time said first counter counts said number stored in said register, and a second counter for counting each time said clock pulse is output, and for outputting said count value to said selecting means.

2. The data transfer apparatus as defined in claim 1 wherein said second counter comprises a n-bit binary counter, n being an integer greater than 0, there are $2^n$ of said plurality of devices, and said selecting means consists of an n-bit-input/$2^n$-bit-output decoder, each of said $2^n$-bit outputs being exclusively for one of said $2^n$ devices.

3. The data transfer apparatus as defined in claim 1 wherein said counting means further comprises:

a limit register for storing a threshold value for said second counter, said second counter returning to an initial value if said count value reaches said threshold value.

4. The data transfer apparatus as defined in claim 1 wherein said transferring means comprises:

a temporary storing means put between said memory and said device selected by said selecting means for temporarily storing data, said transferring means transferring data via said temporary storing means.

5. The data transfer apparatus as defined in claim 4 wherein said selecting means decodes said count value to assert one of a plurality of selection signals, each of which is exclusively for one of said plurality of devices.

6. The data transfer apparatus as defined in claim 5 wherein said counting means further comprises:

a limit register for storing a threshold value for said second counter, said second counter returning to an initial value if said count value reaches said threshold value.

7. A data transfer apparatus to be provided to each of a plurality of processor elements in a parallel computer having $2^n$ processor elements, n being an integer greater than 0, for transferring data between a memory in a processor element having said data transfer apparatus and any of a plurality of devices connected to said plurality of processor elements, wherein said plurality of devices consists of $2^{2n}$ FIFO memories, arrayed in $2^n$ rows×$2^n$ columns of a matrix, such that FIFO memories in a row are connected to a corresponding grow bus and FIFO memories in a column are connected to a corresponding column bus, said data transfer apparatus comprising:

a first buffer means for temporarily storing data;

a first counting means for counting each time a sequence of data is transferred from said memory to any of said plurality of devices;

a first selecting means for decoding a count value output from said first counting, means to select one of said plurality of devices corresponding to said count value;

a first transferring means for transferring data from said memory to said device selected by said first selecting means via said first buffer means, wherein:

said first counting means includes an n-bit binary counter, a transmitting register for storing a number of showing how many times data is to be transferred successively from or to any of said plurality of devices, a first transmitting counter for counting a each time said first transferring means transfers data, and for outputting a clock pulse each time said first transmitting counter counts said number stored in said transmitting register, and a second transmitting counter for counting each time said clock pulse is output from said first transmitting counter, and for outputting a count value to said first selecting means, wherein said count value is said count value output from said first counting means;

said first selecting means includes an n-bit-input/$2^n$-bit-output decoder, wherein each of said $2^n$-bit outputs is output as a selection signal being exclusively for one of said FIFO memories in a predetermined row, such that said first selecting means selects one of said $2^n$ FIFO memories in said predetermined row;

a second buffer means for temporarily storing data;

a second counting means for counting each time a sequence of data is transferred from any one of said plurality of devices to said memory;

a second selecting means for decoding a count value output from said second counting means to select one of said plurality of devices corresponding to said count value;

a second transferring means for transferring data from said one of said plurality of devices selected by said second selecting means to said memory via said second buffer means, wherein:

said second counting means includes an n-bit binary counter, a receiving register for storing a number of showing how many times data is to be transferred successively from or to any one of said plurality of devices, a first receiving counter for counting each time said second transferring means transfers data, and for outputting a clock pulse each time said first receiving counter counts said number stored in said receiving register, and a second receiving counter for counting each time said clock pulse is output from said first receiving counter, and for outputting a count value to said second selecting means, wherein said count value is said count value output from said second counting means;

said second selecting means includes an n-bit-input/$2^n$-bit-output decoder, wherein each of said $2^n$-bit outputs is output as a selection signal being exclusively for one of said FIFO memories in a predetermined column, such that said second selecting means selects one of said $2^n$ FIFO memories in said predetermined column.

8. The data transfer apparatus as defined in claim 7 wherein said first counting means further comprises:

a transmitting limit register for storing a threshold value for said second transmitting counter, said second transmitting counter returning to an initial value if said count value reaches said threshold value, and said second counting means further comprises:

a receiving limit register for storing a threshold value for said second receiving counter, said second receiving counter returning to an initial value if said count value reaches said threshold value.

9. The data transfer apparatus as defined in claim 7 wherein each of said $2^{2n}$ FIFO memories arrayed in $2^n$ rows×$2^n$ columns inputs data from a row bus, and outputs data to a column bus, said first buffer means is connected to said row bus corresponding to said predetermined row, and said second buffer means is connected to said column bus corresponding to said predetermined column.

10. A data transfer system for transferring data in a parallel computing system with $2^n$ processor elements via a network which interconnects said $2^n$ processor elements, n being an integer greater than 0, comprising:

a network comprising a plurality of two-port memories arrayed in $2^n$ rows×$2^n$ columns of matrix, $2^n$ row buses, each of which connects to one of two ports of each of said plurality of two-port memories in a row corresponding to a row bus, and $2^n$ column buses, each of which connects to the other of two ports of each of said plurality of two-port memories in a column corresponding to a column bus, so that a pair, different from each other, of said row bus and said column bus is connected to each of said processor elements; and a plurality of data transfer apparatuses, each of which is provided to a corresponding one of said processor elements, for transferring data between a memory in the same processor element and two-port memories on said pair of row bus and column bus connected to said same process element, each of said each of said data transfer apparatuses comprising:

a first buffer means for temporarily storing data;

a first counting means for counting each time a sequence of data is transferred from said memory in the processor element to any of said two-port memories;

a first selecting means for decoding a count value output from said first counting means to select one of said two-port memories, on said row bus, corresponding to said count value;

a first transferring means for transferring data from said memory in the processor element to said two-port memories selected by said first selecting means via said first buffer means;

a second buffer means for temporarily storing data;

a second counting means for counting each time a sequence of data is transferred from any of said two-port memories to said memory in the processor element;

a second selecting means for decoding a count value output from said counting means to select one of said two-port memories on said column bus, corresponding to said count value; and a second transferring means for transferring data from said two-port memory selected by said second selecting means to said memory in the processor element via said second buffer means.

11. The data transfer system as defined in claim 10 wherein said first counting means consists of an n-bit binary counter, said first selecting means consists of an n-bit input/$2^n$-bit-output decoder, wherein each of said $2^n$-bit outputs is output as a selection signal being exclusively for one of said two-port memories in a predetermined row, said second counting means consists of an n-bit binary counter, said second selecting means consists of an n-bit-input/$2^n$-bit-output decoder, wherein each of said $2^n$-bit outputs is output as a selection signal being exclusively for one of said two-port memories in a predetermined column.

12. The data transfer system as defined in claim 11 wherein said data transfer apparatus comprises:

a first selection signal means for selectively outputting said selection signals output from said first selecting means and said second selecting means to one of said two-port memories on said row bus;

a second selection signal means for selectively outputting said selection signals output from said first selecting means and said second selecting means to one of said two-port memories on said column bus;

a first switching means, connected to said first buffer means, said second buffer means, and said row bus, for selectively switching a data driver from said first buffer means to said row bus and a data driver from said row bus to said second buffer means;

a second switching means, connected to said first buffer means, said second buffer means, and said column bus, for selectively switching said data driver from said column bus to said second buffer means and said data driver from said first buffer means to said column bus, said first transferring means making said first selection signal means and said first switching means select a former option to transfer data to one of said two-port memories on said row bus, and making them select a latter option to transfer data to one of said two-port memories on said column bus, said second transferring means making said second selection signal means and said second switching means select a former option to transfer data from one of said two-port memories on said row bus, and making them select a latter option to transfer data from one of said two-port memories on said column bus.

13. The data transfer system as defined in claim 12 wherein each of said two-port memories comprises:

an FIFO memory which is a First-In-First-Out memory;

a row-bus switching means, connected to the row bus corresponding to said two-port memory, for driving data from said row bus to a data input terminal of said FIFO memory when said first transferring means selects said former option, and for driving data from a data output terminal of said FIFO memory to said row bus when said second transferring means selects said latter option; and a column-bus switching means, connected to the column bus corresponding to the two-port memory, for driving data from a data output terminal of said FIFO memory to said column bus when said second transferring means selects said former option, and for driving data from said column bus to a data input terminal of said FIFO memory when said first transferring means selects said latter option.

* * * * *